(12) United States Patent
Matoba et al.

(10) Patent No.: US 6,999,107 B2
(45) Date of Patent: Feb. 14, 2006

(54) SCALING METHOD AND APPARATUS USING APPROXIMATE SIMPLIFIED SCALING FACTORS

(75) Inventors: Kazuaki Matoba, Tokyo (JP); Kouhei Tamano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 379 days.

(21) Appl. No.: 10/622,698

(22) Filed: Jul. 21, 2003

(65) Prior Publication Data

US 2004/0246377 A1     Dec. 9, 2004

(30) Foreign Application Priority Data

Dec. 26, 2002   (JP) .............................. 2002-376720

(51) Int. Cl.
*G09G 5/02*   (2006.01)

(52) U.S. Cl. ....................................... 345/698; 345/660
(58) Field of Classification Search ................ 345/698, 345/663, 664, 699, 662, 665
See application file for complete search history.

(56) References Cited

U.S. PATENT DOCUMENTS

| | | | |
|---|---|---|---|
| 6,310,602 B1 * | 10/2001 | Kasai et al. ................ | 345/698 |
| 6,348,929 B1 | 2/2002 | Acharya et al. | |
| 6,522,339 B1 * | 2/2003 | Orimo ........................ | 345/606 |
| 6,546,157 B1 | 4/2003 | Okuno et al. | |
| 6,714,210 B1 * | 3/2004 | Yip et al. .................... | 345/667 |
| 6,801,221 B1 * | 10/2004 | Kawamura et al. ......... | 345/698 |
| 2002/0039109 A1 * | 4/2002 | Mamiya et al. ............. | 345/667 |
| 2004/0183817 A1 * | 9/2004 | Kaasila ....................... | 345/660 |

FOREIGN PATENT DOCUMENTS

| | | |
|---|---|---|
| JP | 09-181970 A | 7/1997 |
| JP | 2000-132136 A | 5/2000 |
| JP | 2001-229372 A | 8/2001 |

* cited by examiner

*Primary Examiner*—Kent Chang
*Assistant Examiner*—Donna Lui
(74) *Attorney, Agent, or Firm*—Birch, Stewart, Kolasch & Birch

(57) ABSTRACT

An image is scaled by a desired scaling factor by using an upper scaling factor slightly greater than the desired scaling factor and a lower scaling factor slightly less than the desired scaling factor. The upper and lower scaling factors are applied to different parts of each horizontal or vertical line in the image. Both the upper and lower scaling factors are fractions with numerators and denominators less than the numerator and denominator of the desired scaling factor. The lower scaling factor may be obtained by decomposing the desired scaling factor into unit fractions. Regardless of the value of the desired scaling factor, the image can be scaled without the need for a large interpolation coefficient memory, and without resorting to iterated scaling and its attendant large data transfers.

18 Claims, 14 Drawing Sheets

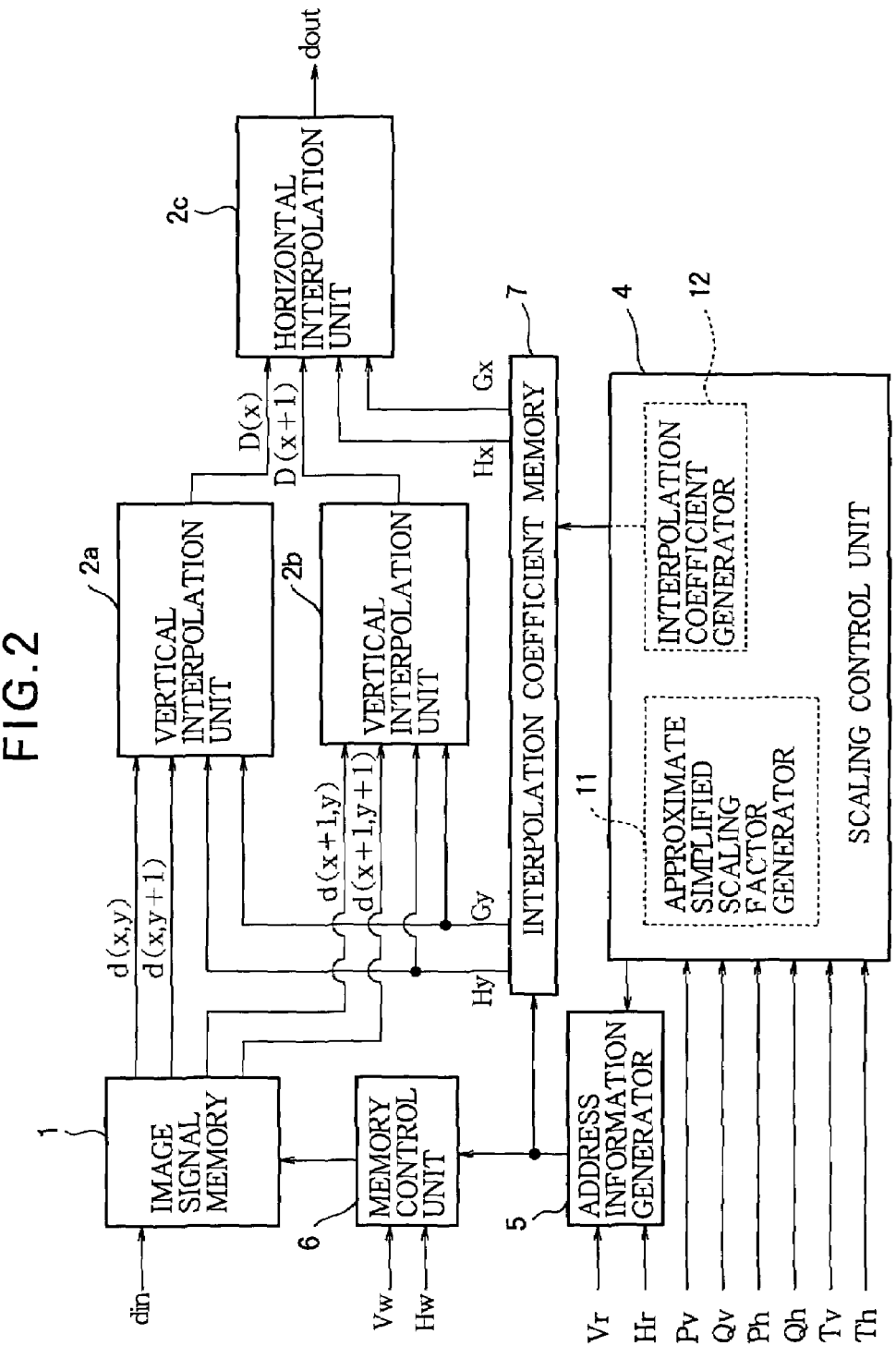

FIG.9

| i | m | n | SELECTED SCALING FACTOR |
|---|---|---|---|
| 19 | 4 | 15 | 4/7 |
| 18 | 8 | 15 | 4/7 |
| 17 | 12 | 15 | 4/7 |
| 16 | 16 | 15 | 4/7 |
| 15 | 16 | 30 | 17/30 |
| 14 | 20 | 30 | 4/7 |
| 13 | 24 | 30 | 4/7 |
| 12 | 28 | 30 | 4/7 |
| 11 | 32 | 30 | 4/7 |
| 10 | 32 | 45 | 17/30 |
| 9 | 36 | 45 | 4/7 |
| 8 | 40 | 45 | 4/7 |
| 7 | 44 | 45 | 4/7 |
| 6 | 48 | 45 | 4/7 |
| 5 | 48 | 60 | 17/30 |
| 4 | 52 | 60 | 4/7 |
| 3 | 56 | 60 | 4/7 |
| 2 | 60 | 60 | 4/7 |
| 1 | 60 | 75 | 17/30 |

$Ph0/Qh0 = 17/30$
$Ph1/Qh1 = 4/7$
$Ah = 4$
$Bh = 15$

SCALING METHOD AND APPARATUS USING APPROXIMATE SIMPLIFIED SCALING FACTORS

BACKGROUND OF THE INVENTION

1. Field of the Invention

The present invention relates to a method and apparatus for converting the resolution of an image signal.

2. Description of the Related Art

The resolution of an image signal refers to the number of picture elements or pixels (dots) in the image, measured in the horizontal and vertical directions. Resolution conversion is necessary when an image signal input in a format having a prescribed resolution is displayed on a display device having a different resolution. Such conversion is frequently needed when an image captured by a camera is displayed on a dot matrix display device such as a liquid crystal display (LCD), a plasma display panel (PDP), or a digital micromirror device (DMD). Similar conversion is needed when an image is displayed at a reduced size in a window inside another image (picture in picture), or when multiple images are displayed at reduced sizes on the same screen (picture and picture). Resolution conversion is also referred to as scaling.

Conventional scaling apparatus has, for example, an image signal memory, an interpolation coefficient memory, a scaling control unit, a memory address generator, and an interpolation unit. The apparatus operates by reading a source image signal from the image signal memory, performing interpolation, and outputting the interpolated pixels as a scaled image signal. Interpolation may either increase or decrease the number of pixels in the image; that is, the image may be either enlarged or reduced. The vertical and horizontal scaling factors may accordingly be either greater than or less than unity.

A scaling factor can be represented as a fraction P/Q, where Q corresponds to the height or width of the source image and P corresponds to the height or width of the scaled image, P and Q being positive integers. The scaling process can be carried out in a simple way by enlarging the image by a factor of P and reducing the enlarged image by a factor of Q. A disadvantage of this simple scheme is that the enlargement process must be carried out at P times the sampling frequency of the source image, which may not be feasible for large values of P.

A solution to this problem, disclosed in Japanese Unexamined Patent Application Publication No. 9-181970 (1997), is to prestore P sets of interpolation coefficients in a register memory, and select the appropriate interpolation coefficients for each pixel according to phase information indicating the position of the interpolated pixel relative to the adjacent source pixels used as reference pixels for interpolation. The image can then be scaled by a factor of P/Q in a single operation, without having any circuits operate faster than the sampling frequency of the source image or converted image. A disadvantage of this scheme is that when P is large, a large register memory is needed to store the interpolation coefficients.

For many values of P, the necessary amount of register memory can be reduced by the use of an iterated scheme disclosed in Japanese Unexamined Patent Application Publication No. 2001-229372, in which P/Q is expressed as a product of two fractions having smaller numerators and denominators and scaling is carried out twice. To scale an image by a factor of $128/225$, for example, the image may be scaled first by a factor of $8/9$, then by a factor of $16/25$, so that no more than sixteen sets of interpolation coefficients have to be stored at a time. This scheme also simplifies the generation of the addresses of reference pixels in the source image, enabling the scaling operation to be carried out by a general-purpose processor such as a digital signal processor with relative simple built-in memory control circuitry, instead of by a specialized scaling processor.

One disadvantage of the iterated scaling scheme is the need for a large frame memory to store the intermediate image created by the first scaling operation, and the need to transfer large amounts of pixel data to and from this frame memory, with attendant delays.

Another disadvantage is that iterated scaling is applicable only when P can be factored. For example, iterated scaling cannot be used to enlarge an image by a factor of $463/175$, because 463 is a prime number.

It would be desirable to have a method and apparatus that can scale an image by an arbitrary scaling factor without the need to operate at a high sampling frequency, store a large number of interpolation coefficients, or transfer a large amounts of intermediate pixel data.

SUMMARY OF THE INVENTION

A general object of the present invention is to solve the problems described above.

A first more specific object is to provide a scaling apparatus that can implement any scaling factor with a small interpolation coefficient memory, no matter how large the numerator P of the scaling factor P/Q.

A second specific object is to provide a scaling apparatus that can avoid excessive amounts of pixel data transfer during the conversion process, even if the conversion process is carried out by use of a plurality of scaling factors.

In the invented scaling method, a source scaling factor indicating the ratio of the input resolution to the output resolution is received, and upper and lower approximate simplified scaling factors are calculated. The upper approximate simplified scaling factor is greater than the source scaling factor; the lower approximate simplified scaling factor is less than the source scaling factor. Both approximate simplified scaling factors are fractions with numerators less than the numerator of the source scaling factor and denominators less than the denominator of the source scaling factor. Repetition counts indicating how often the upper and lower approximate simplified scaling factors are to be used are also calculated.

In the scaling operation, an input source image signal is stored in an image signal memory. The upper and lower approximate simplified scaling factors and their repetition counts are used to generate address information for reading reference pixels from the image signal memory, a selection signal indicating whether to perform scaling by the upper approximate simplified scaling factor or the lower approximate simplified scaling factor, and phase information indicating the positional relationship between each interpolated pixel and the reference pixels from which the interpolated pixel is generated. Interpolation coefficients corresponding to the upper and lower approximate simplified scaling factors and the phase information are also generated; the interpolation coefficients may be generated as needed, or may be generated ahead of time and stored in a memory. The source image signal is read from the image signal memory according to the address information; interpolation is performed, using the interpolation coefficients corresponding to the approximate simplified scaling factor selected by the selection signal; and the interpolated pixels are output.

By replacing a source scaling factor an arbitrary numerator with a pair of approximate simplified scaling factors having smaller numerators, the invention reduces the necessary amount of interpolation coefficient memory. By using the upper and lower approximate simplified scaling factors selectively, in different parts of the source image, instead of converting the resolution of the entire image first by one scaling factor then by another scaling factor, the invention avoids the need to transfer large amounts of pixel data between different scaling steps, and can be used even when the numerator of the source scaling factor is a prime number.

BRIEF DESCRIPTION OF THE DRAWINGS

In the attached drawings:

FIG. 2 is a more detailed block diagram of the scaling apparatus in FIG. 1, showing the input and output signals and the internal structure of the interpolation unit;

FIG. 9 illustrates the procedure in FIG. 8 for a source scaling factor of $128/225$;

DETAILED DESCRIPTION OF THE INVENTION

Figure 1:
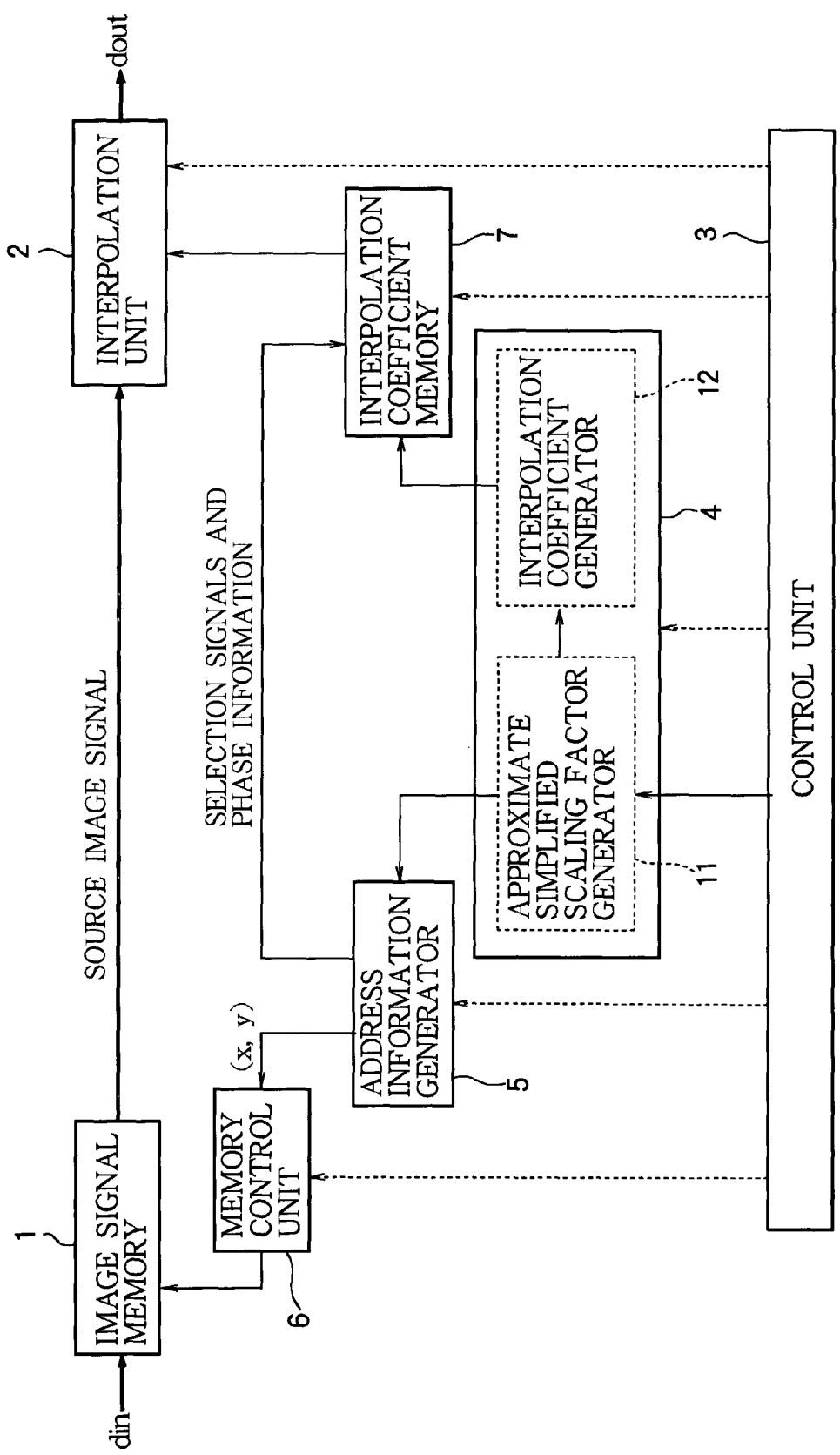
FIG. 1 is a block diagram of a scaling apparatus according to a first embodiment of the invention.

Embodiments of the invention will now be described with reference to the attached drawings, in which like elements are indicated by like reference characters.

First Embodiment

FIG. 1 is a block diagram of a scaling apparatus according to a first embodiment of the invention. The scaling apparatus comprises an image signal memory 1, an interpolation unit 2, a control unit 3, a scaling control unit 4, an address information generator 5, a memory control unit 6, and an interpolation coefficient memory 7. FIG. 2 shows the input and output signals of these component elements and the internal structure of the interpolation unit 2.

The image signal memory 1 provides temporary storage for the pixel data (din) of the source image signal. When an address such as (x, y) is specified, the corresponding stored pixel data value d(x, y) is read out and sent to the interpolation unit 2.

The interpolation unit 2 comprises a pair of vertical interpolation units 2a and 2b and a horizontal interpolation unit 2c. The vertical interpolation units 2a and 2b perform vertical interpolation by multiplying reference pixel data read from the image signal memory 1 by interpolation coefficients Hy and Gy selected from the interpolation coefficient memory 7. The horizontal interpolation unit 2c performs horizontal interpolation on the vertically interpolated data, using interpolation coefficients Hx and Gx selected from the interpolation coefficient memory, and outputs the resulting scaled image signal (dout) to, for example, a display device (not shown). The interpolation coefficients are selected so as to convert one or more parts of each horizontal or vertical line by an upper approximate simplified scaling factor and the remaining one or more parts by a lower approximate simplified scaling factor, as will be described below.

The control unit 3 controls the scaling operation by controlling each component of the scaling apparatus, and by supplying two source scaling factors Ph/Qh and Pv/Qv and two limit values Tv and Th. Ph/Qh is a horizontal scaling factor indicating the ratio of the number of input pixels to the number of output pixels in a horizontal line. Pv/Qv is a vertical scaling factor indicating the ratio of the number of input pixels to the number of output pixels in a vertical line. Tv and Th are limit values that limit the numerators and denominators of the simplified scaling factors. Tv and Th may be specified as numerical limits or limits on the number of bits or digits.

The scaling control unit 4 comprises an approximate simplified scaling factor generator 11 and an interpolation coefficient generator 12.

The approximate simplified scaling factor generator 11 receives the values of Pv, Qv, Ph, Qh, Tv, and Th, and generates upper and lower approximate simplified scaling factors and their repetition counts for the vertical and horizontal directions. The upper approximate simplified scaling factors are fractions, greater than the corresponding source scaling factors, having numerators and denominators limited by the corresponding limit values; the lower approximate simplified scaling factors are fractions, less than the corresponding source scaling factors, having numerators and denominators limited by the corresponding limit values; the repetition counts indicate how often the upper and lower approximate simplified scaling factors are to be selected in each vertical or horizontal line.

When the approximate simplified scaling factor generator 11 generates a lower approximate simplified scaling factor from a source scaling factor, the operation depends on whether the source scaling factor is a proper or an improper fraction. If the source scaling factor is a proper fraction, that is, if the numerator Ph or Pv is smaller than the denominator Qh or Qv, the approximate simplified scaling factor generator 11 decomposes the fraction into unit fractions and adds the unit fractions in ascending order of denominator, proceeding as far as possible without having the denominator of the resultant sum fraction exceed the limit value. If the source scaling factor is an improper fraction, that is, if the numerator Ph or Pv is greater than the denominator Qh or Qv, the approximate simplified scaling factor generator 11 changes the improper fraction to a mixed number, decomposes the fractional part of the mixed number into unit fractions, and adds the unit fractions in ascending order of denominator to the integral part, proceeding as far as possible without having the numerator of the resultant sum, which is an improper fraction, exceed the limit value.

The repetition count for each lower approximate simplified scaling factor is generated from the denominator Qh or Qv of the source scaling factor, the denominator of the lower approximate simplified scaling factor, and the limit value. The upper approximate simplified scaling factors and their repetition counts are generated from the source scaling factors, the lower approximate simplified scaling factors, and the repetition counts of the lower approximate simplified scaling factors.

The interpolation coefficient generator 12 generates upper and lower interpolation coefficients corresponding to the upper and lower approximate simplified scaling factors.

The scaling control unit 4 supplies the approximate simplified scaling factors and their repetition counts to the address information generator 5, and supplies the interpolation coefficients to the interpolation coefficient memory 7.

The address information generator 5 receives a vertical synchronizing (sync) signal Vr and a horizontal synchronizing (sync) signal Hr synchronized with the output image signal (dout), and receives the upper and lower approximate simplified scaling factors and their repetition counts for the vertical and horizontal directions from the approximate simplified scaling factor generator 11. For each interpolated pixel, the address information generator 5 generates the addresses of reference pixel data to be read from the image signal memory 1. The address information generator 5 also generates address information for reading interpolation coefficients from the interpolation coefficient memory 7; this address information takes the form of a selection signal selecting the upper approximate simplified scaling factor or the lower approximate simplified scaling factor, and phase information indicating the positional relationship or phase difference between the interpolated pixel and its reference pixels.

The memory control unit 6 receives a vertical sync signal Vw and a horizontal sync signal Hw synchronized with the source pixel data (din), and controls the writing of the source image signal into the image signal memory 1. The memory control unit 6 also controls the reading of the source image signal from the image signal memory 1, in accordance with the address information received from the address information generator 5.

The interpolation coefficient memory 7 temporarily stores the upper and lower interpolation coefficients generated by the interpolation coefficient generator 12 and supplies the interpolation unit 2 (interpolation units 2a, 2b, and 2c) with interpolation coefficients in accordance with the information received from the address information generator 5.

Figure 3A:
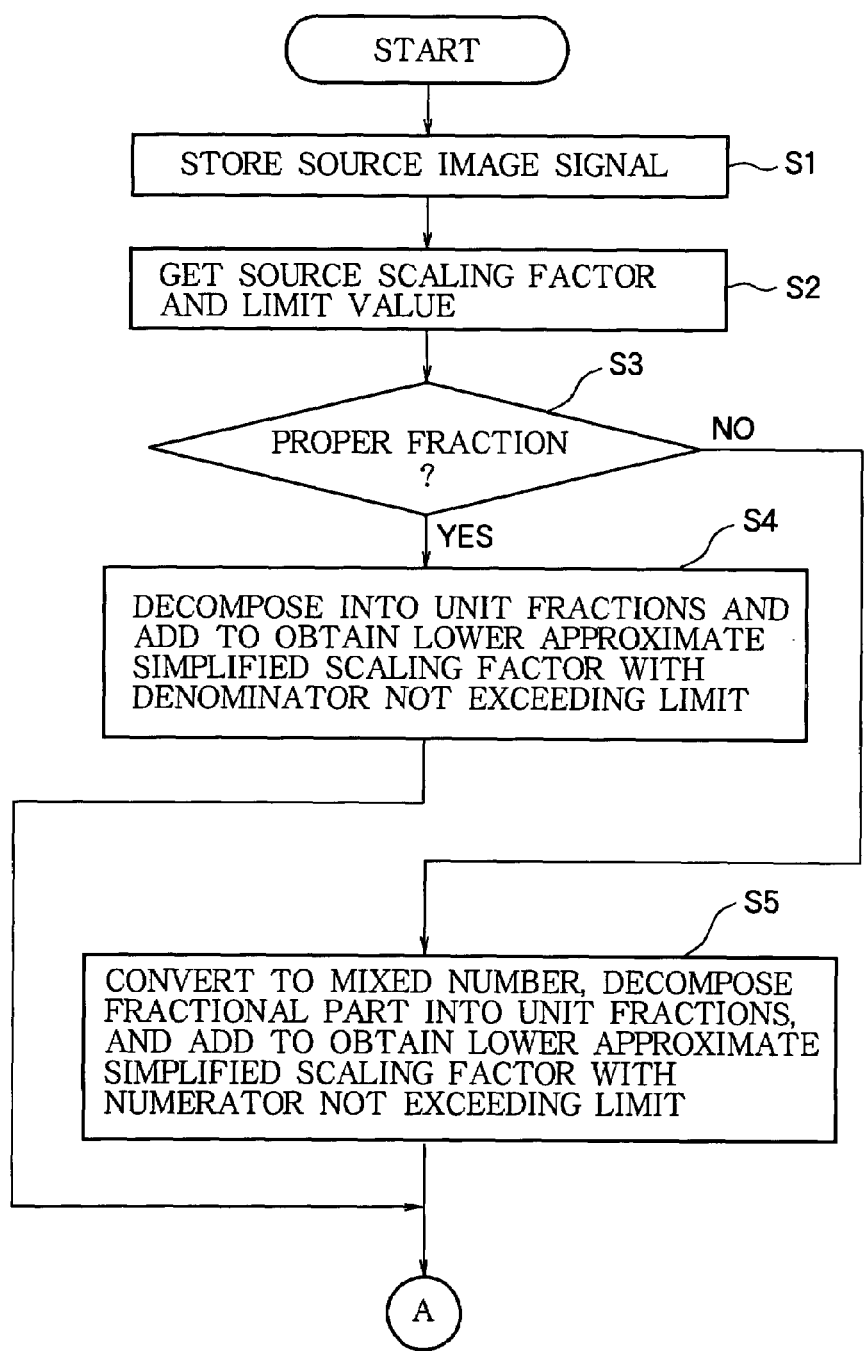
FIGS. 3A and 3B are a flow chart describing the operation of the scaling apparatus shown in FIGS. 1 and 2.
Figure 3B:
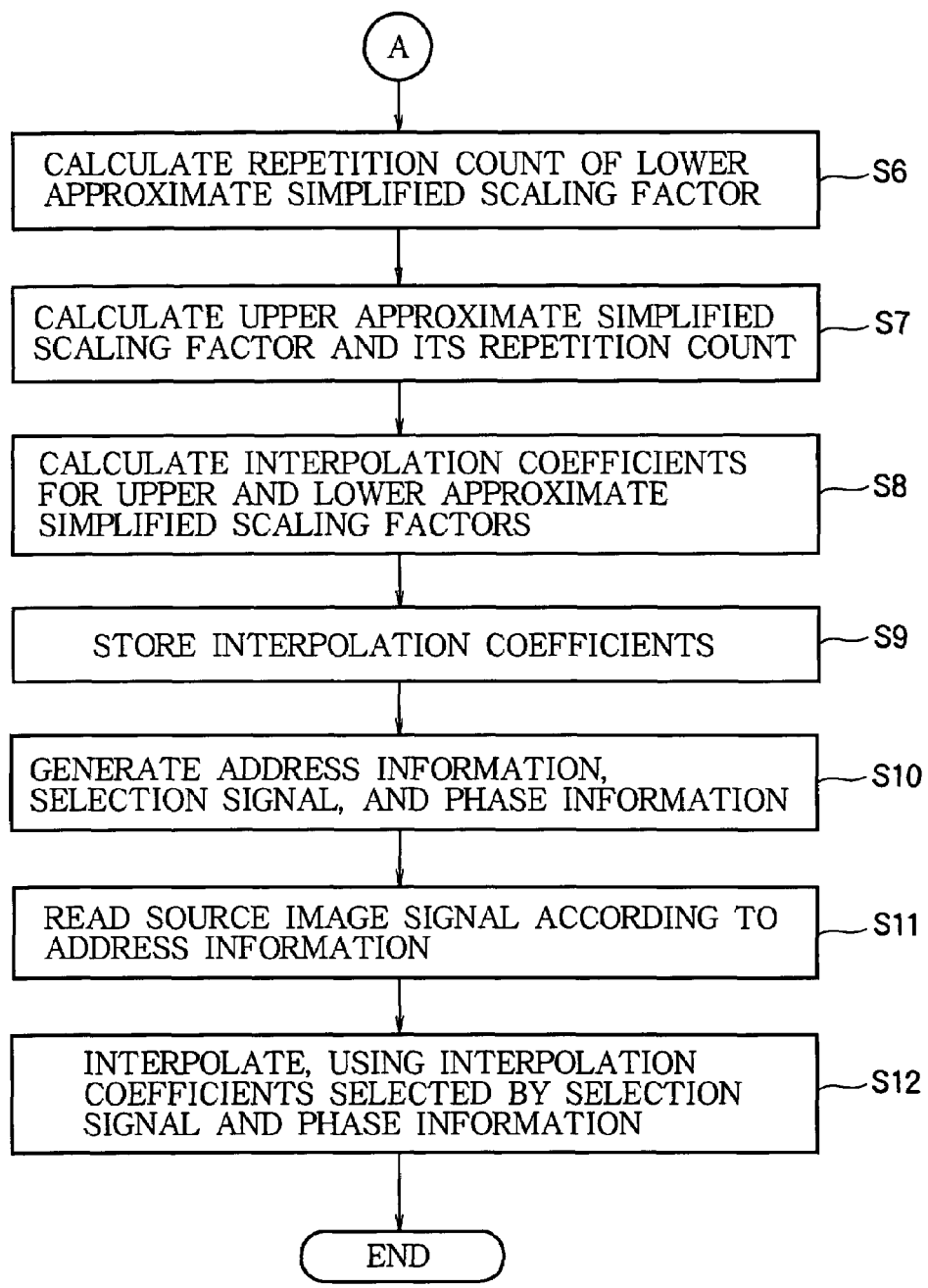

The flow chart in FIGS. 3A and 3B describes the operation of the scaling apparatus shown in FIGS. 1 and 2. Steps S3 to S9 are carried out for both the vertical and horizontal directions.

Step S1: The image signal memory 1 temporarily stores the input source image signal (din).

Step S2: The approximate simplified scaling factor generator 11 receives the source scaling factors and limit values. As explained above, the source scaling factors indicate vertical and horizontal ratios of the input pixel resolution to the output pixel resolution, and the limit values limit the size of the numerators and denominators of the simplified scaling factors.

Step S3: The approximate simplified scaling factor generator 11 checks whether each source scaling factor is a proper fraction. If so, step S4 is executed and step S5 is skipped. If not, step S4 is skipped and step S5 is executed.

Step S4: The approximate simplified scaling factor generator 11 decomposes the proper fraction into unit fractions and obtains a lower approximate simplified scaling factor by adding the unit fractions in ascending order of denominator, continuing as long as the denominator of sum stays within the limit value.

Step S5: The approximate simplified scaling factor generator 11 changes the improper fraction to a mixed number, decomposes the fractional part of the mixed number into unit fractions, and obtains a lower approximate simplified scaling factor by adding the unit fractions in ascending order of denominator to the integral part of the mixed number, continuing as long as the numerator of the new improper fraction representing the sum stays within the limit value.

Step S6: The approximate simplified scaling factor generator 11 calculates the repetition count indicating how often the lower approximate simplified scaling factor is to be used in each horizontal or vertical line, on the basis of the source scaling factor, the lower approximate simplified scaling factor, and the limit value.

Step S7: The approximate simplified scaling factor generator 11 calculates the upper approximate simplified scaling factor and its repetition count, on the basis of the source scaling factor, the lower approximate simplified scaling factor, and its repetition count.

The calculated results are output to the address information generator 5, and the numerators of the upper and lower approximate simplified scaling factors are output to the interpolation coefficient generator 12.

Step S8: The interpolation coefficient generator 12 generates upper and lower interpolation coefficients corresponding to the upper and lower approximate simplified scaling factors, and outputs those coefficients to the interpolation coefficient memory 7.

Step S9: The interpolation coefficient memory 7 stores the interpolation coefficients.

Step S10: The address information generator 5 generates address information for reading pixels from the image signal memory 1, selection signals indicating whether to perform scaling by the upper or lower approximate simplified scaling factor, and phase information indicating the phase differences between the reference pixels and the interpolated pixels. As will be explained below, the address information generator 5 performs these functions by taking cumulative sums of the reciprocals of the upper and lower approximate simplified scaling factors and cumulative sums of the repetition counts.

Step S11: The memory control unit 6 reads the source image signal from the image signal memory 1 in accordance with the address information supplied by the address information generator 5.

Step S12: The interpolation unit 2 performs interpolation on the source image signal by using both the upper and lower approximate simplified scaling factors, as selected by the selection signal.

Figure 4:
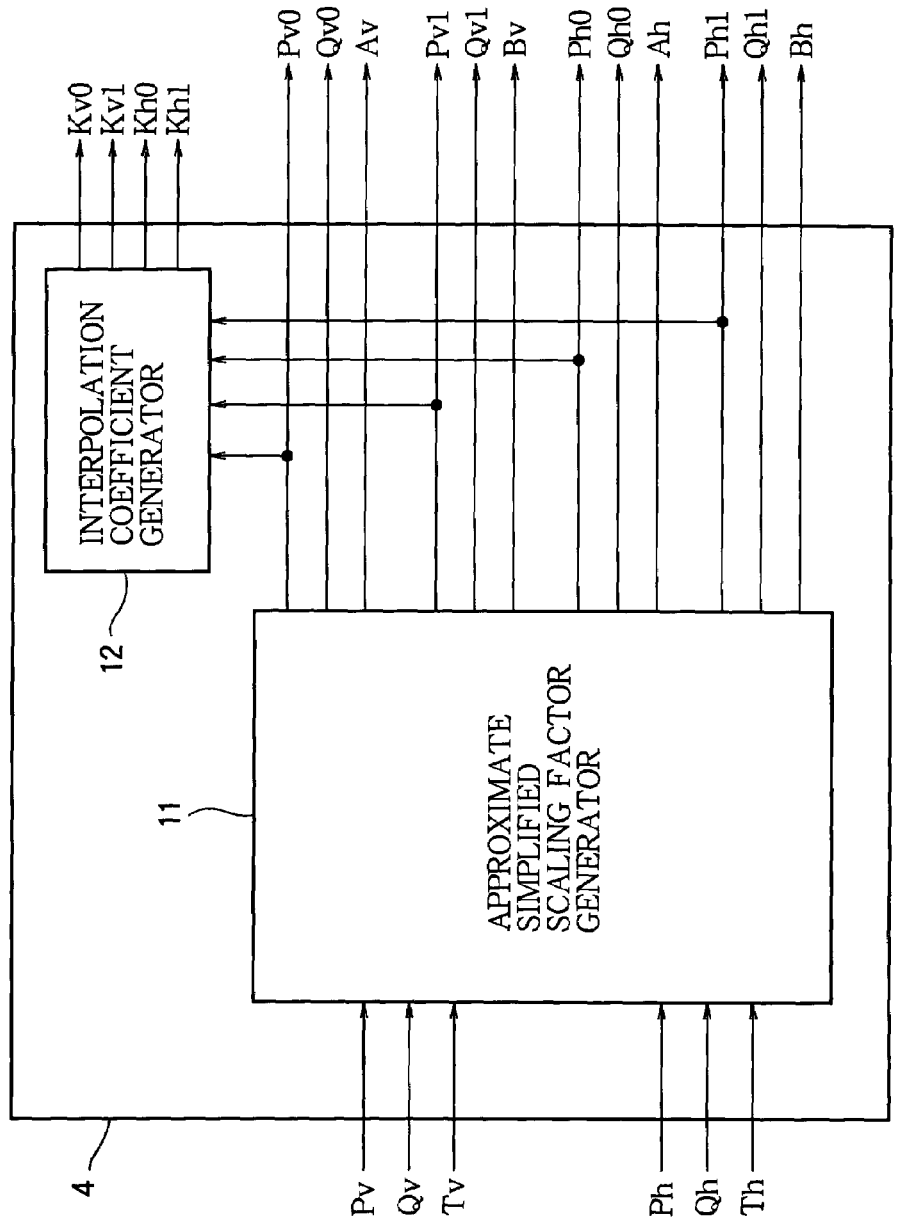
FIG. 4 is a detailed block diagram showing how signals are input and output in the scaling control unit shown in FIGS. 1 and 2.

FIG. 4 is a detailed block diagram showing how signals are input and output in the scaling control unit 4 shown in FIGS. 1 and 2.

The approximate simplified scaling factor generator 11 generates Pv0, Qv0, Pv1, Qv1, Av, and Bv from the numerator Pv and the denominator Qv of the source scaling factor and the limit value Tv for the vertical direction. Pv0 and Qv0 are respectively the numerator and denominator of the lower (first) approximate simplified scaling factor for the vertical direction. Pv1 and Qv1 are respectively the numerator and denominator of the upper (second) approximate simplified scaling factor for the vertical direction. Av is the repetition count indicating how often the first approximate simplified scaling factor is to be selected in each vertical line of the output image format. Bv is the repetition count indicating how often the second approximate simplified scaling factor is to be selected in each vertical line of the output image format.

The approximate simplified scaling factor generator 11 supplies Pv0, Qv0, Pv1, Qv1, Av, and Bv to the address information generator 5, and Pv0 and Pv1 to the interpolation coefficient generator 12.

The approximate simplified scaling factor generator 11 generates Ph0, Qh0, Ph1, Qh1, Ah, and Bh from the numerator Ph and the denominator Qh of the source scaling factor and the limit value Th for the horizontal direction. Ph0 and Qh0 are respectively the numerator and denominator of the lower (first) approximate simplified scaling factor for the horizontal direction. Ph1 and Qh1 are respectively the numerator and denominator of the upper (second) approximate simplified scaling factor for the horizontal direction. Ah is a repetition count indicating how often the first approximate simplified scaling factor is to be selected in each horizontal line of the output image format. Bh is a repetition count indicating how often the second approximate simplified scaling factor is to be selected in each horizontal line of the output image format.

The approximate simplified scaling factor generator 11 supplies Ph0, Qh0, Ph1, Qh1, Ah, and Bh to the address information generator 5, and Ph0 and Ph1 to the interpolation coefficient generator 12.

The repetition counts Av, Bv, Ah, and Bh are calculated so that combined use of the upper and lower approximate simplified scaling factors converts the source image signal to a scaled image signal having prescribed numbers of pixels in the horizontal and vertical directions, exactly matching, for example, the image format of an output display device.

The interpolation coefficient generator 12 generates interpolation coefficients Kv0, Kv1, Kh0, and Kh1 and supplies them to the interpolation coefficient memory 7. Kv0 is generated from Pv0, Kv1 from Pv1, Kh0 from Ph0, and Kh1 from Ph1. Each generated value Kv0, Kv1, Kh0, or Kh1 represents a pair of interpolation coefficients corresponding to a specific phase difference between an interpolated pixel and its reference pixels. The interpolation coefficient generator 12 generates interpolation coefficients for all possible phase differences, and supplies all of them to the interpolation coefficient memory 7.

The generation of the first and second approximate simplified scaling factors by the approximate simplified scaling factor generator 11 will now be described in more detail.

In this embodiment, the first and second approximate simplified scaling factors for the vertical direction Pv0/Qv0 and Pv1/Qv1 are generated from the source scaling factor for the vertical direction Pv/Qv in a way that ensures that Pv0, Pv1, Qv0, and Qv1 do not exceed the limit value Tv. The integers Pv, Qv, Pv0, Qv0, Pv1, Qv1, Av, and Bv satisfy the following relationships:

$$Pv/Qv \approx Pv0/Qv0 \quad (1)$$

$$Pv/Qv \approx Pv1/Qv1 \quad (2)$$

$$Pv = Av \times Pv0 + Bv \times Pv1 \quad (3)$$

$$Qv = Av \times Qv0 + Bv \times Qv1 \quad (4)$$

The first and second approximate simplified scaling factors for the horizontal direction Ph0/Qh0 and Ph1/Qh1 are generated from the source scaling factor for the horizontal direction Ph/Qh in a way that ensures that Ph0, Ph1, Qh0, and Qh1 do not exceed the limit value Th. The integers Ph, Qh, Ph0, Qh0, Ph1, Qh1, Ah, and Bh satisfy the following relationships:

$$Ph/Qh \approx Ph0/Qh0 \quad (5)$$

$$Ph/Qh \approx Ph1/Qh1 \quad (6)$$

$$Ph = Ah \times Ph0 + Bh \times Ph1 \quad (7)$$

$$Qh = Ah \times Qh0 + Bh \times Qh1 \quad (8)$$

Figure 5:
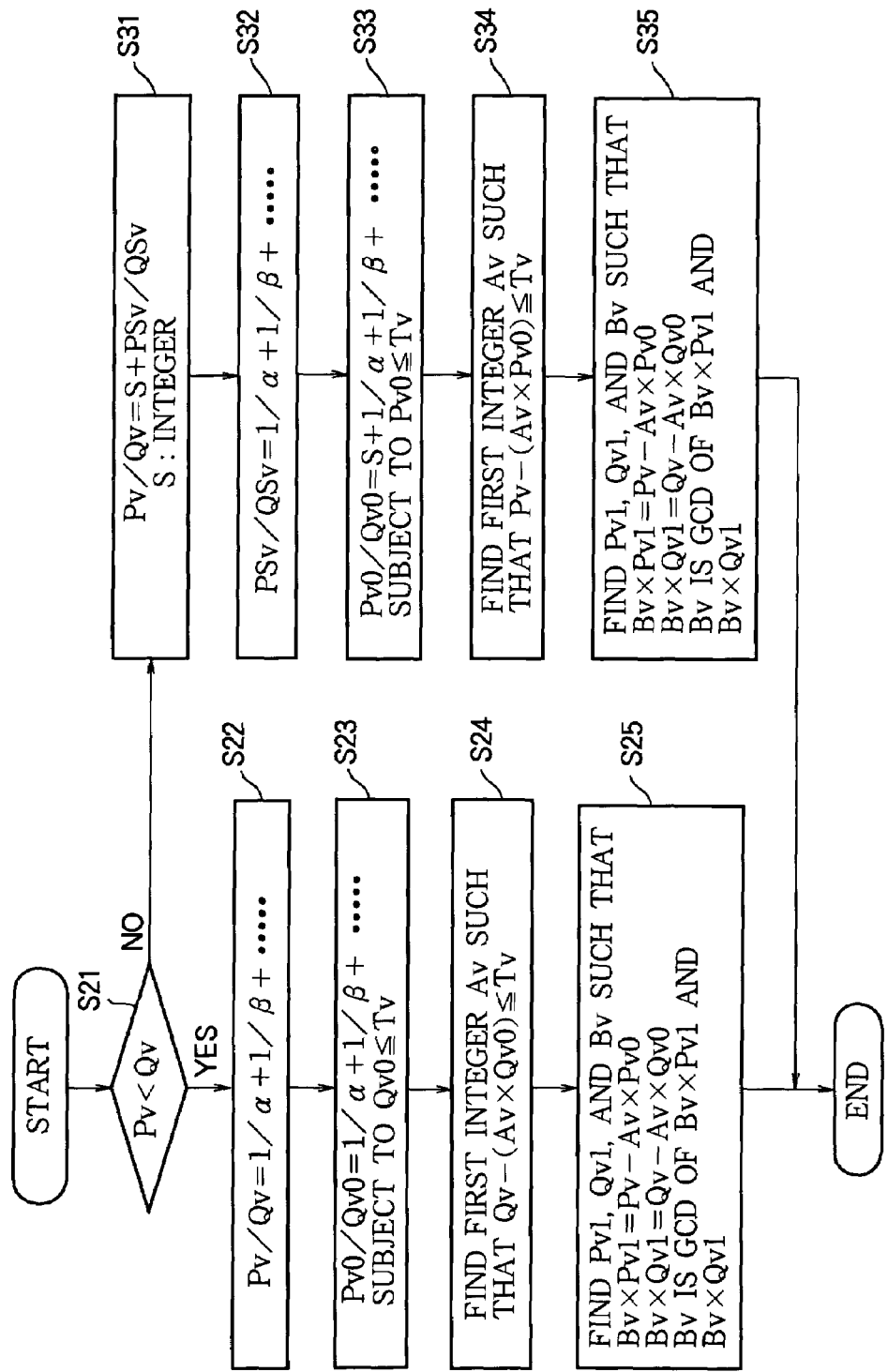
FIG. 5 is a flow chart describing the generation of the scaling factors for the vertical direction.

The generation of the simplified scaling factors for the vertical direction will now be described, with reference to the flow chart shown in FIG. 5.

Step S21: The approximate simplified scaling factor generator 11 checks whether Pv is smaller than Qv. If so, that is, if the number of pixels in the vertical direction is to be reduced, step S22 is executed next. If not, that is, if the number of pixels in the vertical direction is to be increased, step S31 is executed next.

Step S22: The approximate simplified scaling factor generator 11 decomposes the proper fraction Pv/Qv into unit fractions, such as ½, ⅓, ¼, . . . .

Step S23: The approximate simplified scaling factor generator 11 generates the first scaling factor Pv0/Qv0 by adding the unit fractions obtained in step S22 in ascending order of denominator, proceeding as far as possible without having the denominator of the resultant fraction exceed the limit value Tv.

Step S24: The approximate simplified scaling factor generator 11 calculates the repetition count Av indicating how often the first scaling factor Pv0/Qv0 is to be selected in each vertical line of the output image format. Av must be chosen so that the term Bv×Qv1 in equation (4) does not exceed Tv. Av may be set to the first (least) integer satisfying the following condition (4').

$$Qv - Av \times Qv0 \leq Tv \quad (4')$$

Step S25: The approximate simplified scaling factor generator 11 calculates the second scaling factor Pv1/Qv1 and its repetition count Bv from the source scaling factor Pv/Qv and the values of Pv0, Qv0, and Av. To minimize Pv1 and Qv1, Bv is taken to be the greatest common divisor (GCD) of Pv−(Av×Pv0) and Qv−(Av×Qv0). Pv1 and Qv1 are obtained by dividing these two quantities by Bv.

Step S31: The approximate simplified scaling factor generator 11 changes the improper fraction Pv/Qv to a mixed number S+PSv/QSv, where S is an integer and PSv/QSv is a proper fraction.

Step S32: The approximate simplified scaling factor generator 11 decomposes the proper fraction PSv/QSv into unit fractions.

Step S33: The approximate simplified scaling factor generator 11 generates the first scaling factor Pv0/Qv0 by adding the unit fractions obtained in step S32 in ascending order of denominator to the integer S, proceeding as far as possible without having the numerator of the resultant new improper fraction exceed the limit value Tv.

Step S34: The approximate simplified scaling factor generator 11 calculates the repetition count Av indicating how often the first scaling factor Pv0/Qv0 is to be selected in each vertical line of the output image format. Av must be chosen so that the term Bv×Pv1 in equation (3) does not exceed Tv. Av may be set to the first (least) integer satisfying the following condition (3').

$$Pv - Av \times Pv0 \leq Tv \quad (3')$$

Step S35: The approximate simplified scaling factor generator 11 calculates the second scaling factor $Pv1/Qv1$ and its repetition count Bv by the same procedure as in step S25.

If $Pv/Qv=128/225$ and $Tv=128$, steps S21 to S25 are performed as follows.

The source scaling factor $128/225$ for the vertical direction is decomposed into unit fractions:

$$128/225 = 1/2 + 1/15 + 1/450$$

The first scaling factor $Pv0/Qv0$ is obtained:

$$Pv0/Qv0 = 1/2 + 1/15 = 17/30$$

The value (30) of $Qv0$ is substituted into condition 4':

$$225 - Av \times 30 \leq 128$$

The least integer Av satisfying this condition is:

$$Av = 4$$

Substituting $Pv=128$, $Qv=225$, $Pv0=17$, $Qv0=30$, and $Av=4$ into equations (3) and (4) gives $Bv \times Pv1 = 60$ and $Bv \times Qv1 = 105$. The greatest common factor of 60 and 105 is 15, from which $Bv=15$, $Pv1=4$, and $Qv1=7$ are obtained.

The source scaling factor $Pv/Qv=128/225$ thus yields a first scaling factor $Pv0/Qv0=17/30$, a second scaling factor $Pv1/Qv1=4/7$, a repetition count $Av=4$ for the first scaling factor, and a repetition count $Bv=15$ for the second scaling factor.

If $Pv/Qv=463/175$ and $Tv=128$, steps S31 to S35 are performed. The source scaling factor $463/175$ for the vertical direction is changed to a mixed number, and the fractional part is decomposed into unit fractions:

$$463/175 = 2 + (1/2 + 1/7 + 1/350)$$

The first scaling factor $Pv0/Qv0$ is:

$$Pv0/Qv0 = 2 + (1/2 + 1/7) = 37/14$$

The value (37) of $Pv0$ is substituted into condition 3':

$$463 - Av \times 37 \leq 128$$

The least integer Av satisfying this condition is:

$$Av = 10$$

Substituting $Pv=463$, $Qv=175$, $Pv0=37$, $Qv0=14$, and $Av=10$ into equations (3) and (4) gives $Bv \times Pv1 = 93$ and $Bv \times Qv1 = 35$. The greatest common factor of 93 and 35 is 1, from which $Bv=1$, $Pv1=93$, and $Qv1=35$ are obtained.

The source scaling factor $Pv/Qv=463/175$ thus yields a first scaling factor $Pv0/Qv0=37/14$, a second scaling factor $Pv1/Qv1=93/35$, a repetition count $Av=10$ for the first scaling factor, and a repetition count $Bv=1$ for the second scaling factor.

The scaling parameters for the horizontal direction are obtained in the same way as for the vertical direction. From the source scaling factor for the horizontal direction $Ph/Qh$, a first scaling factor for the horizontal direction $Ph0/Qh0$, a second scaling factor for the horizontal direction $Ph1/Qh1$, a repetition count Ah indicating how often the first scaling factor is to be repeated in each horizontal line, and a repetition count Bh indicating how often the second scaling factor is to be repeated in each horizontal line are obtained, satisfying expressions (5), (6), (7), and (8).

When scaling is carried out according to the first embodiment, each vertical line of the output image can be divided into a plurality of parts, the pixels in some parts being obtained by use of the first vertical scaling factor, the pixels in other parts being obtained by use of the second vertical scaling factor. Similarly, each horizontal line in the output image can similarly be divided into a plurality of parts, the pixels in some parts being obtained by use of the first horizontal scaling factor, the pixels in other parts being obtained by use of the second horizontal scaling factor.

The process by which the reference pixel addresses and phase information are obtained will now be described with reference to FIG. 6. This drawing shows the positional relationships among the interpolated pixels and the corresponding source pixels used as reference pixels in one part of a horizontal line when the horizontal scaling factor $Ph/Qh$ is $5/4$. The source pixels are represented by circles, and the interpolated pixels by triangles. In this drawing, $Ph/Qh$ represents either the upper approximate simplified scaling factor $Ph1/Qh1$ or the lower approximate simplified scaling factor $Ph0/Qh0$.

The two groups of pixels are numbered separately from left to right. The interpolated pixels are disposed at regular intervals of Qh at positions that would result from upsampling of the source image by a factor of Ph. A cumulative sum obtained by successive addition of the reciprocal $Qh/Ph$ of the scaling factor, and the integers representing the quotient and remainder of the division operation indicated by the cumulative sum, are also indicated. The quotient gives the position or address of the first of the two reference pixels, and the remainder gives the phase difference between the first reference pixel and the interpolated pixel.

For instance, the cumulative sum corresponding to interpolated pixel 2 is $8/5$. Because the quotient of $8/5$ is 1, the first reference pixel is source pixel 1. Source pixel 2 is therefore the second reference pixel. Because the remainder of $8/5$ is 3, the phase difference between the interpolated pixel and the first reference pixel is 3. The phase difference between the interpolated pixel and the second reference pixel is the difference between the remainder and Ph, that is, $3-5=-2$.

Figure 6:
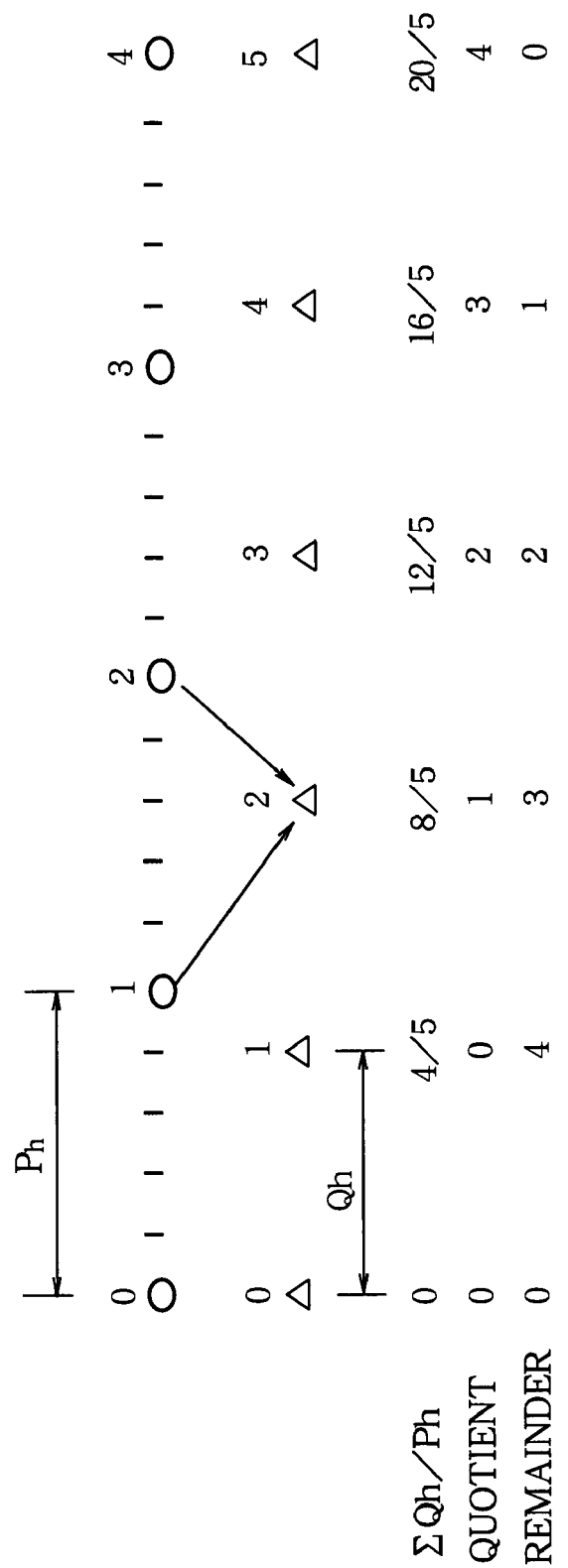
FIG. 6 illustrates the process by which address and phase information are obtained.

The value of an interpolated pixel in FIG. 6 is determined by adding the value of the first reference pixel multiplied by an interpolation coefficient to the value of the second reference pixel multiplied by another interpolation coefficient. The interpolation coefficients are obtained from the phase differences.

Figure 7:
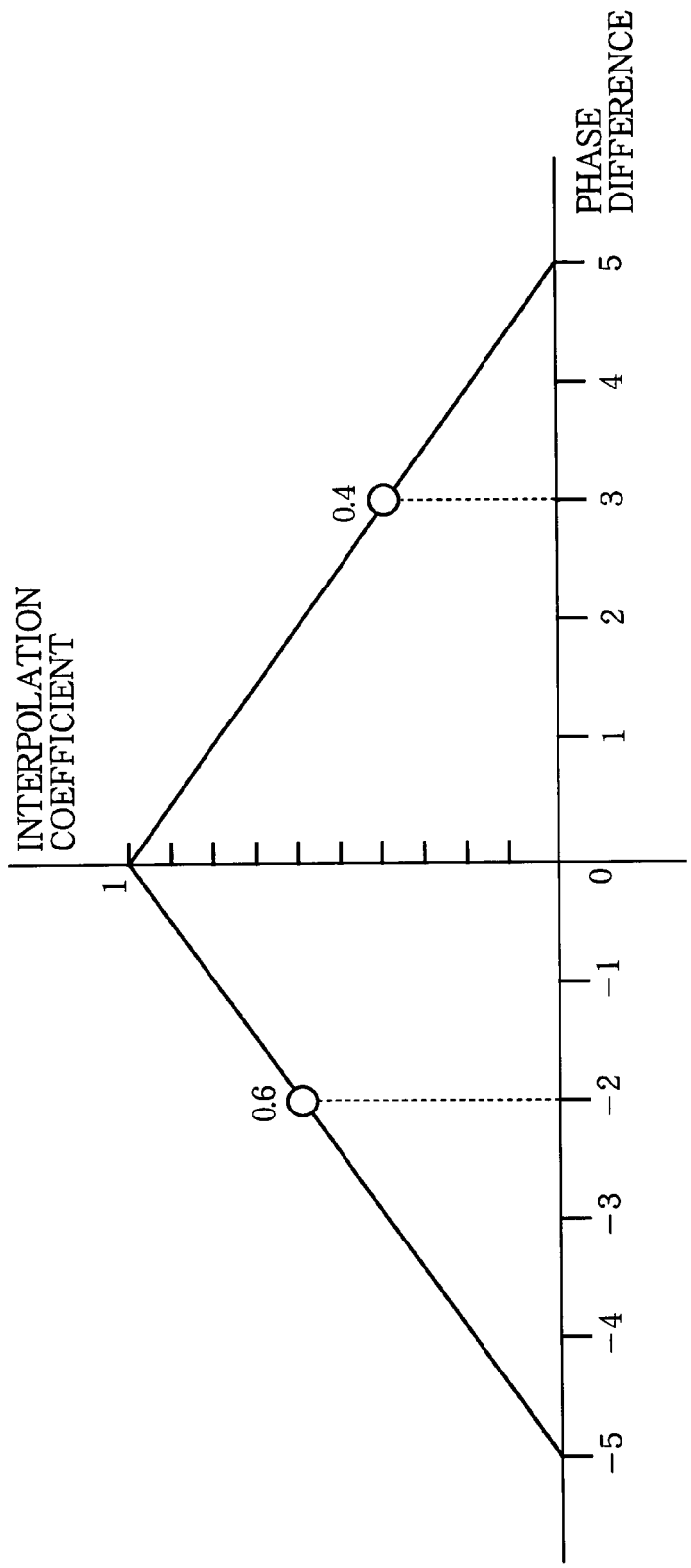
FIG. 7 is a graph illustrating linear interpolation coefficients.

FIG. 7 shows a sample graph of coefficients for linear interpolation by the scaling factor of $5/4$ in FIG. 6. The horizontal axis indicates the phase difference between the reference pixels and the interpolated pixel, and the vertical axis indicates the corresponding interpolation coefficient values. For interpolated pixel 2 in FIG. 6, for instance, the graph in FIG. 7 indicates that the interpolation coefficient of the first reference pixel is 0.4, and the interpolation coefficient of the second reference pixel is 0.6.

Although the length of the graph in FIG. 7 is $2 \times Ph$, the phase with respect to the second reference pixel is determined by the phase with respect to the first reference pixel, so to provide for all possible phase values, it is only necessary to store Ph pairs of interpolation coefficients.

The interpolation coefficient generator 12 generates $Pv0+Pv1+Ph0+Ph1$ pairs of interpolation coefficients in this way, covering every possible phase difference between the reference pixels and the interpolated pixel for each of the four simplified scaling factors. The interpolation coefficient memory 7 temporarily stores the interpolation coefficients.

The method of generating interpolation coefficients is not limited to the linear method illustrated in FIG. 7. A variety of other known methods can be applied, including, for instance, the method disclosed in Japanese Unexamined Patent Application Publication No. 2000-132136, in which the interpolation coefficients are related to distance from the interpolated pixel by a decreasing function having a derivative less than −1 in part of the distance domain.

The address information generator 5 shown in FIGS. 1 and 2 receives Pv0, Qv0, Pv1, Qv1, Av, By, Ph0, Qh0, Ph1, Qh1, Ah, and Bh, and generates both the address information (x, y) of the source reference pixels used for interpolation, and the phase differences Rh and Rv in the horizontal and vertical directions between the interpolated pixels and their reference pixels. The address information (x, y) is supplied to the memory control unit 6; the phase differences Rh and Rv are supplied to the interpolation coefficient memory 7.

The selection of the different simplified scaling factors by the address information generator 5 will next be described. In the first embodiment, each horizontal line and each vertical line are subdivided into parts, and either the upper or the lower approximate simplified scaling factor is selected for each part. The repetition count of a simplified scaling factor indicates the number of parts for which the scaling factor is selected. The size of each part is equal in the source image to the denominator of the simplified scaling factor, and in the scaled image to the numerator of the simplified scaling factor.

If the source scaling factor is $128/225$, for instance, then instead of scaling a line of 225 source pixels by the conventional uniform scaling factor of $128/255$, the first embodiment divides the line into nineteen parts. A lower approximate simplified scaling factor of $17/30$ is used in four parts, converting 30×4=120 pixels to 17×4=68 pixels, while an upper approximate simplified scaling factor of $4/7$ is used in fifteen parts, converting 7×15=105 pixels to 4×15=60 pixels. In total, 120+105=225 pixels are converted to 68+60=128 pixels, achieving the same overall result as by conventional methods.

The simplified scaling factors are close to the source scaling factor but differ slightly therefrom. If each horizontal or vertical line were simply divided into two segments, the lower approximate simplified scaling factor being used in one segment and the upper approximate simplified scaling factor in the other segment, the converted image might have a visibly unbalanced appearance. The first embodiment avoids an unbalanced appearance by interleaving the parts of the image in which different simplified scaling factors are used in an intricate pattern that creates a balanced impression overall.

Figure 8:
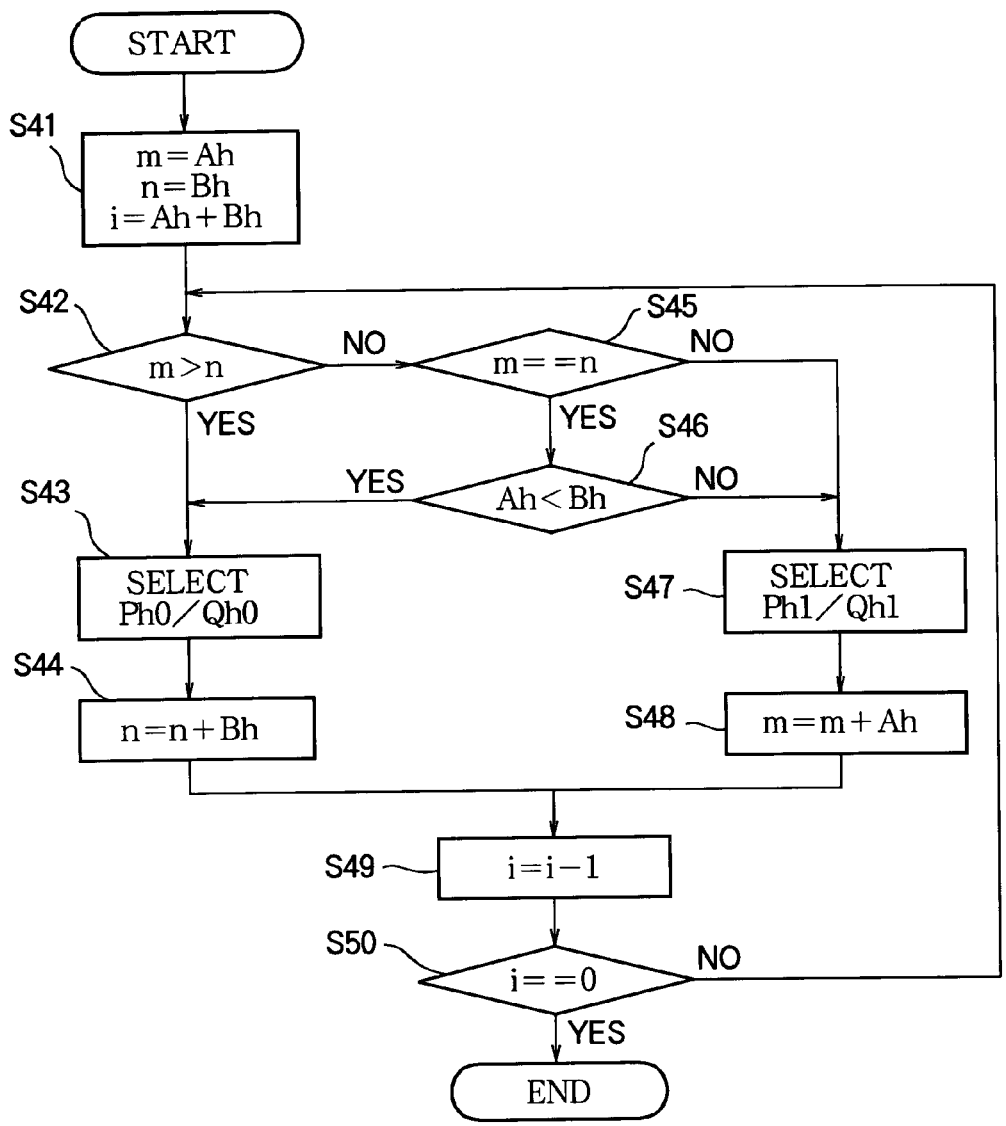
FIG. 8 is a flow chart describing a procedure for selecting the upper and lower approximate simplified scaling factors.

The flow chart in FIG. 8 indicates how the simplified scaling factors are selected to construct this pattern in the horizontal direction. The same method can be used in the vertical direction.

In FIG. 8, m is a cumulative sum to which the repetition count of the lower approximate simplified scaling factor is added each time the upper approximate simplified scaling factor is selected for one part of a horizontal line; n is a cumulative sum to which the repetition count of the upper approximate simplified scaling factor is added each time the lower approximate simplified scaling factor is selected; i is the total number of repetitions remaining in the combined repetition counts of the upper and lower approximate simplified scaling factors. The values of m and n are held in separate registers; the value of i is held in a counter.

Step S41: The value of m is set to Ah, the repetition count of the lower approximate simplified scaling factor. The value of n is set to Bh, the repetition count of the upper approximate simplified scaling factor. The value of i is set to Ah+Bh.

Step S42: Whether m is greater than n is tested. If so, the process proceeds to step S43. If not, it proceeds to step S45.

Step S43: The lower approximate simplified scaling factor Ph0/Qh0 is selected.

Step S44: Bh is added to n.

Step S45: Whether m equals n is tested. If so, the process proceeds to step S46. If not, it proceeds to step S47.

Step S46: Whether Ah is smaller than Bh is tested. If so, the process proceeds to step S43. If not, it proceeds to step S47.

Step S47: The upper approximate simplified scaling factor Ph1/Qh1 is selected.

Step S48: Ah is added to m.

Step S49: After step S44 or S48, the value of i is decremented by 1.

Step S50: Whether the value of i has reached 0 is tested. If so, the process ends. If not, it returns to step S42.

Steps S42 to S50 are repeated (Ah+Bh) times, until the value of i reaches 0.

FIG. 9 indicates the changing values of i, m, and n and the selected scaling factors when the process indicated in FIG. 8 is carried out for a source scaling factor of $128/225$. The upper approximate simplified scaling factor $4/7$ is selected fifteen times, four interpolated pixels being output each time, as the value of i decreases 19 to 16, from 14 to 11, from 9 to 6, and from 4 to 2. The lower approximate simplified scaling factor $17/30$ is selected four times, 17 interpolated pixels being output each time, when the value of i is 15, 10, 5, and 1. The upper and lower approximate simplified scaling factors are thus selected and repeated in an intricate pattern that makes the image appear to have been evenly scaled.

By comparing cumulative sums of the repetition counts of the upper and lower approximate simplified scaling factors for each horizontal line and each vertical line, the address information generator 5 generates selection signals KVsel and KHsel that indicate whether to perform scaling by the upper approximate simplified scaling factor or the lower approximate simplified scaling factor. The address information generator 5 also generates phase information indicating the phase difference between each interpolated pixel and its reference pixels, in accordance with the selected scaling factor. The address information generator 5 supplies these signals and phase information to the interpolation coefficient memory 7, and supplies reference pixel addresses (x, y) to the memory control unit 6.

Because the upper and lower approximate simplified scaling factors used by the approximate simplified scaling factor generator 11 have numerators and denominators that do not exceed Tv and Th, the processes of obtaining the reference pixel addresses and the phase differences between the reference pixels and the interpolated pixels can be implemented in a relatively small amount of circuitry in the address information generator 5.

The memory control unit 6 controls the writing of source pixel data (din) in the image signal memory 1 according to the horizontal and vertical synchronizing signals Hw and Vw, which are synchronized with the source pixel data (din), and reads reference pixel data d(x, y), d(x+1, y), d(x, y+1), and d(x+1, y+1) from the image signal memory 1 in accordance with the address information (x, y). Vertical interpolation unit 2a receives d(x, y) and d(x, y+1); vertical interpolation unit 2b receives d(x+1, y) and d(x+1, y+1).

Figure 10:
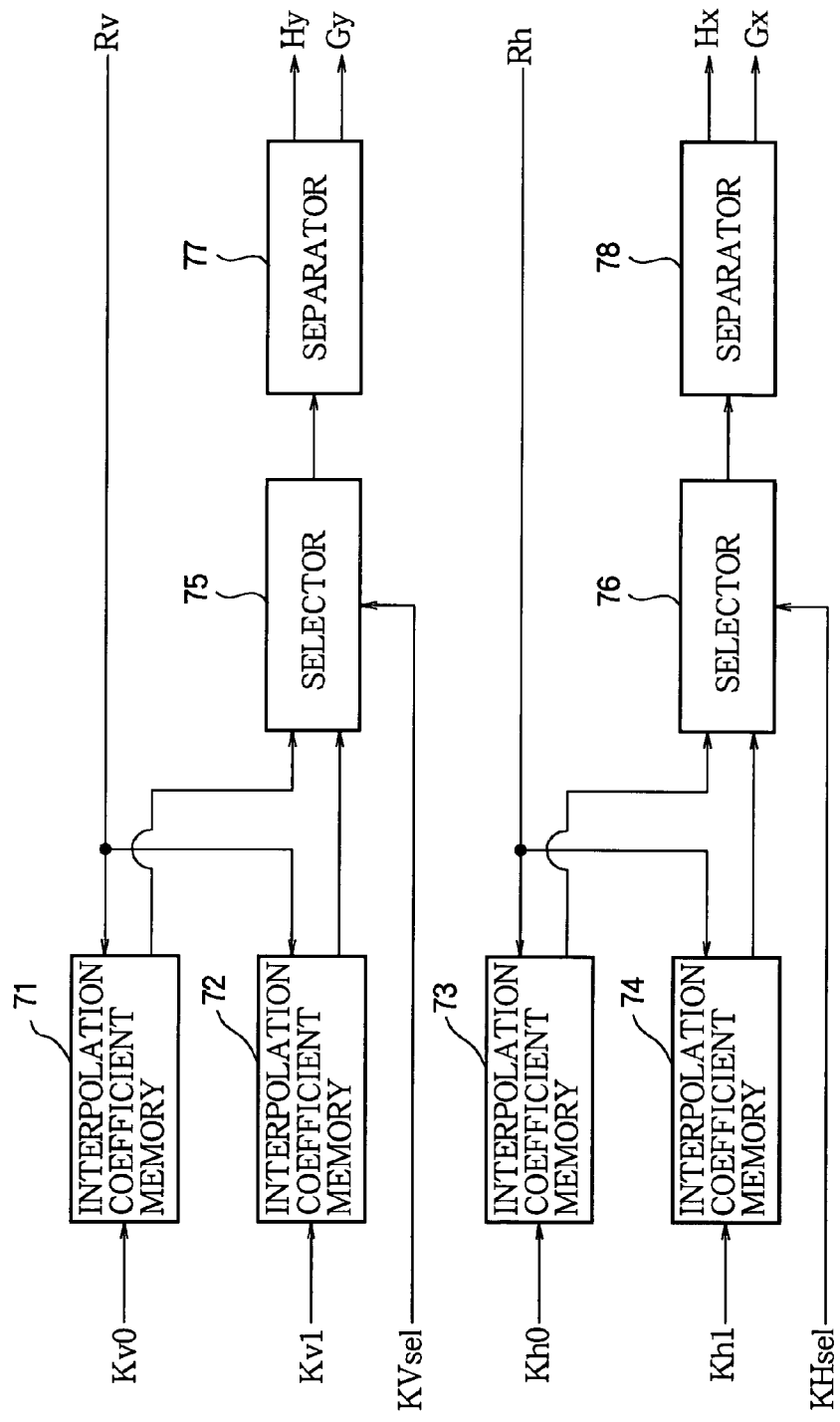
FIG. 10 is a block diagram showing an exemplary structure of the interpolation coefficient memory in FIG. 1.

FIG. 10 is a block diagram showing an exemplary structure of the interpolation coefficient memory 7, which temporarily stores the interpolation coefficients. The interpolation coefficients are read according to the phase information Rv, Rh and selection signals KVsel, KHsel supplied from the address information generator 5.

The interpolation coefficient memory 7 comprises interpolation coefficient memories 71, 72, 73, and 74. Interpolation coefficient memories 71 and 72 are coupled through a selector 75 to a separator 77. Interpolation coefficient memories 73 and 74 are coupled through a selector 76 to a separator 78.

Interpolation coefficient memory 71 temporarily stores the interpolation coefficients Kv0 corresponding to the lower approximate simplified vertical scaling factor. Interpolation coefficient memory 72 temporarily stores the interpolation coefficients Kv1 corresponding to the upper approximate simplified vertical scaling factor. Interpolation coefficient memory 73 temporarily stores the interpolation coefficients Kh0 corresponding to the lower approximate simplified horizontal scaling factor. Interpolation coefficient memory 74 temporarily stores the interpolation coefficients Kh1 corresponding to the upper approximate simplified horizontal scaling factor. Different values of Kv0, Kv1, Kh0, and Kh1 correspond to different phase relationships between an interpolated pixel and its first reference pixel, as indicated in FIGS. 6 and 7.

The interpolation coefficients for scaling in the vertical direction are read from addresses in interpolation coefficient memories 71 and 72 specified by the vertical phase information Rv supplied by the address information generator 5. The interpolation coefficients for scaling in the horizontal direction are read from addresses in interpolation coefficient memories 73 and 74 specified by the horizontal phase information Rh supplied by the address information generator 5.

Selector 75 selects interpolation coefficients corresponding to either the upper or the lower approximate simplified vertical scaling factor, as specified by the selection signal KVsel received from the address information generator 5. Selector 76 similarly selects interpolation coefficients corresponding to either the upper or the lower approximate simplified horizontal scaling factor, as specified by selection signal KHsel.

Separator 77 separates the interpolation coefficient data Kv0 or Kv1 selected by selector 75 into an interpolation coefficient Hy for the first reference pixel and another interpolation coefficient Gy for the second reference pixel, and supplies these interpolation coefficients to the interpolation unit 2. Separator 78 similarly separates the interpolation coefficient data selected by selector 76 into an interpolation coefficient Hx for the first reference pixel and another interpolation coefficient Gx for the second reference pixel, and supplies these interpolation coefficients to the interpolation unit 2.

Regardless of the value of the source scaling factor, the interpolation coefficient memory 7 in the first embodiment only needs to store a limited amount of coefficient data, because the numerators of the upper and lower approximate simplified scaling factors are limited. A modest amount of interpolation coefficient memory therefore suffices for any source scaling factor.

The first embodiment combines different scaling factors by selecting different interpolation coefficients from the interpolation coefficient memory 7 during a single scaling operation, instead of by performing iterated scaling. Excessive amounts of intermediate pixel data transfer can therefore be avoided.

Figure 11:
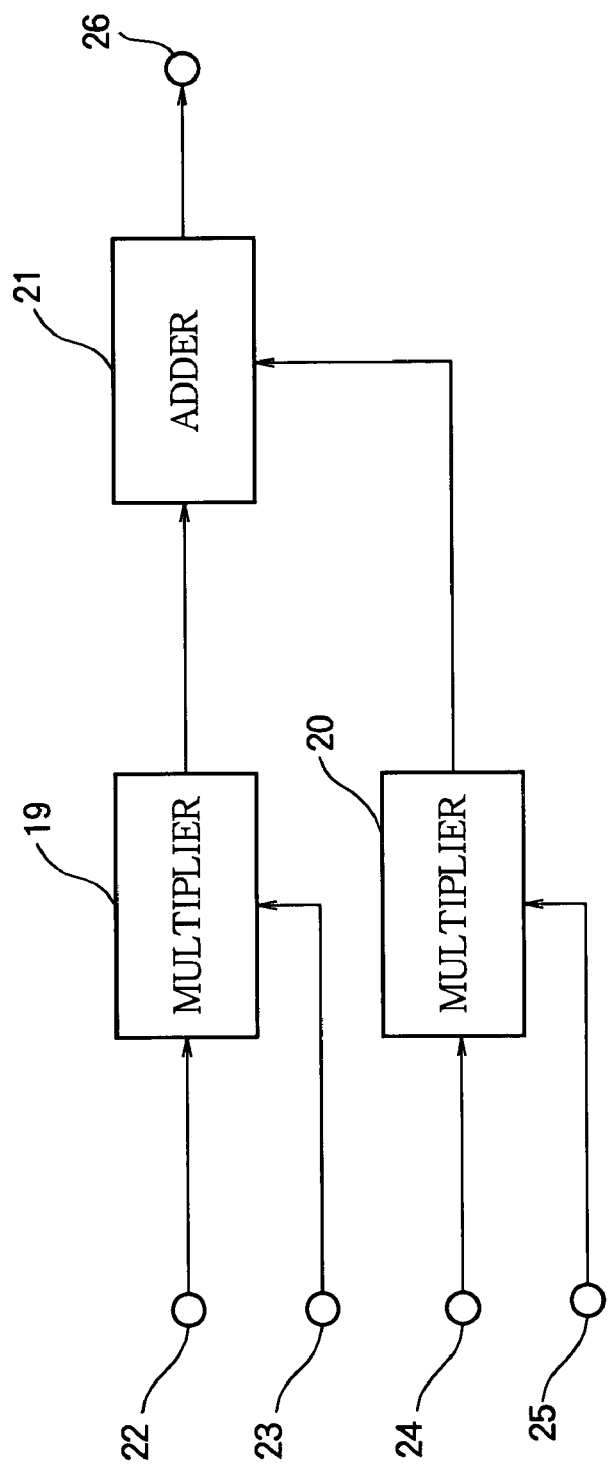
FIG. 11 is a block diagram showing an exemplary structure of the interpolation units in FIG. 2.

FIG. 11 is a block diagram showing an exemplary structure of vertical interpolation unit 2a. Vertical interpolation unit 2b and horizontal interpolation unit 2c have the same structure as vertical interpolation unit 2a.

Vertical interpolation unit 2a has four input terminals 22 to 25, a pair of multipliers 19 and 20, an adder 21, and an output terminal 26. Reference pixel data d(x, y) read from the image signal memory 1 is input through input terminal 22 to multiplier 19. Similarly, reference pixel data d(x, y+1) is input through input terminal 24 to multiplier 20. Vertical interpolation coefficient Hy is read from the interpolation coefficient memory 7 and input through input terminal 23 to multiplier 19. Similarly, vertical interpolation coefficient Gy is input through input terminal 25 to multiplier 20.

Multiplier 19 multiplies reference pixel data d(x, y) by interpolation coefficient Hy, and supplies the resulting product Hy×d(x, y) to the adder 21. Multiplier 20 multiplies reference pixel data d(x, y+1) by interpolation coefficient Gy, and supplies the product Gy×d(x, y+1) to the adder 21.

The adder 21 adds Hy×d(x, y) and Gy×d(x, y+1) and outputs the sum Hy×d(x, y)+Gy×d(x, y+1) as an interpolation result D(x) from the output terminal 26 to the horizontal interpolation unit 2c.

Vertical interpolation unit 2b operates similarly. The reference pixel data d(x+1, y) and d(x+1, y+1) supplied from the image signal memory 1 are multiplied by the same vertical interpolation coefficients Hy and Gy. The products Hy×d(x+1, y) and Gy×d(x+1, y+1) are added, and the sum is output as an interpolation result D(x+1) from the output terminal 26 to the horizontal interpolation unit 2c.

In the horizontal interpolation unit 2c, the vertical interpolation results D(x) and D(x+1) are supplied to the two multipliers. The multipliers also receive horizontal interpolation coefficients Hx and Gx from the interpolation coefficient memory 7. The first multiplier multiplies D(x) by Hx and supplies the product Hx×D(x) to the adder. The second multiplier multiplies D(x+1) by Gx and supplies the product Gx×D(x+1) to the adder. The adder outputs the sum Hx×D(x)+Gx×D(x+1) through the output terminal, thereby interpolating a new pixel value between the vertical interpolation results D(x) and D(x+1), the new pixel being derived from the values of the source pixels with addresses (x, y), (x+1, y), (x, y+1), and (x+1, y+1) and based approximately on the vertical and horizontal source scaling factors.

This operation is repeated with varying values of x, Hx, and Gx to generate an entire horizontal line of interpolated pixels; then the values of y, Hy, and Gy are changed as necessary and the next horizontal line is generated. This process continues until the entire source image has been scaled. It is not necessary to store any intermediate pixel data.

In the apparatus of the first embodiment, since upper and lower approximate simplified scaling factors having limited numerators and denominators are used in place of the source scaling factor P/Q, no matter how large the numerator P of the source scaling factor may be, scaling can be carried out with a relatively small amount of interpolation coefficient memory. Since the upper and lower approximate simplified scaling factors are used in different parts of each vertical or horizontal line, excessive amounts of pixel data transfer are unnecessary during the scaling process. Scaling by any factor can be implemented with little concern for hardware constraints such as size and clock frequency.

Second Embodiment

The second embodiment differs from the first embodiment in that the interpolation coefficient memory is eliminated. The interpolation coefficients are generated by relatively simple calculations such as linear interpolation based on the phase information and selection signals output from the address information generator.

Figure 12:
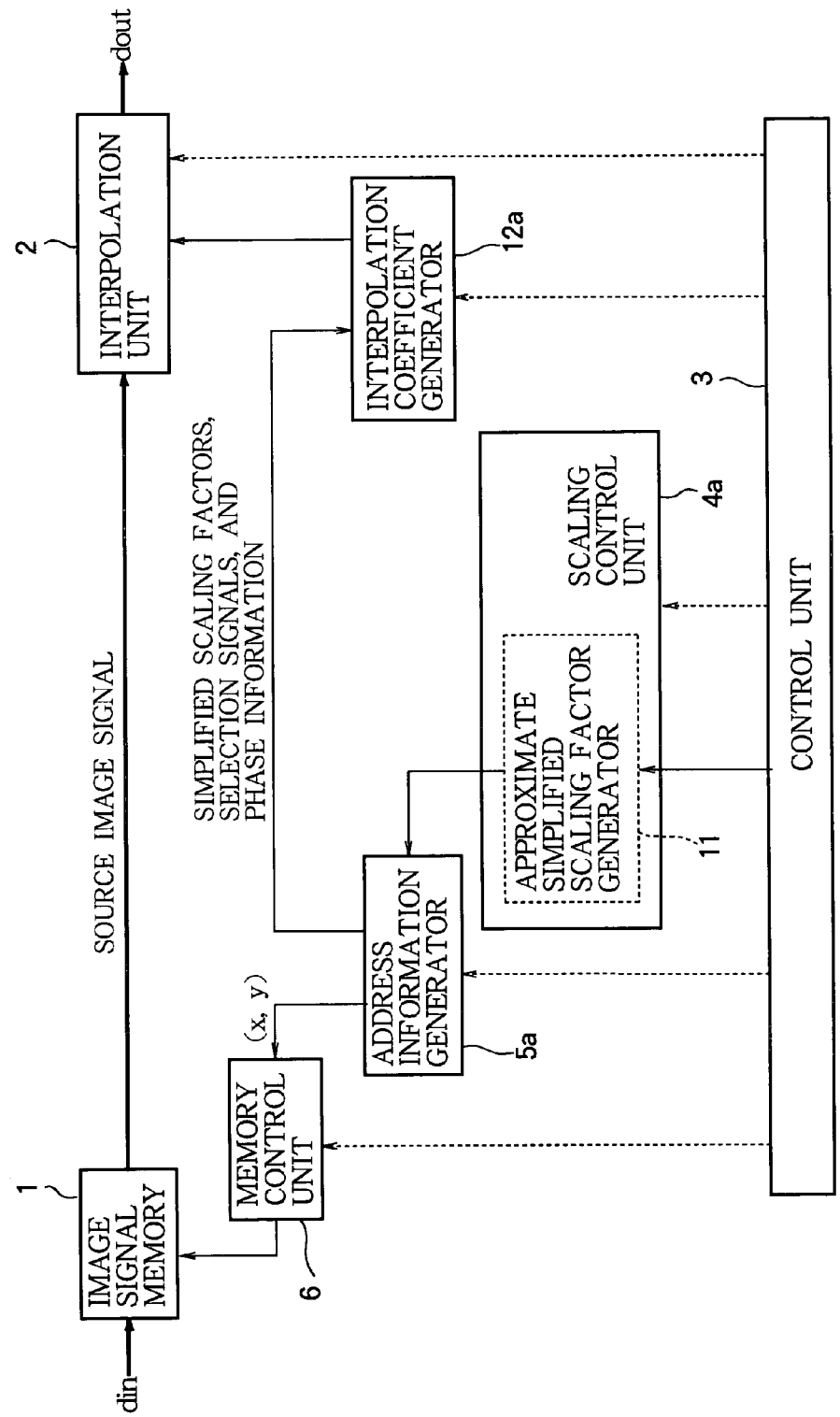
FIG. 12 is a block diagram of a scaling apparatus according to a second embodiment of the invention.
Figure 13:
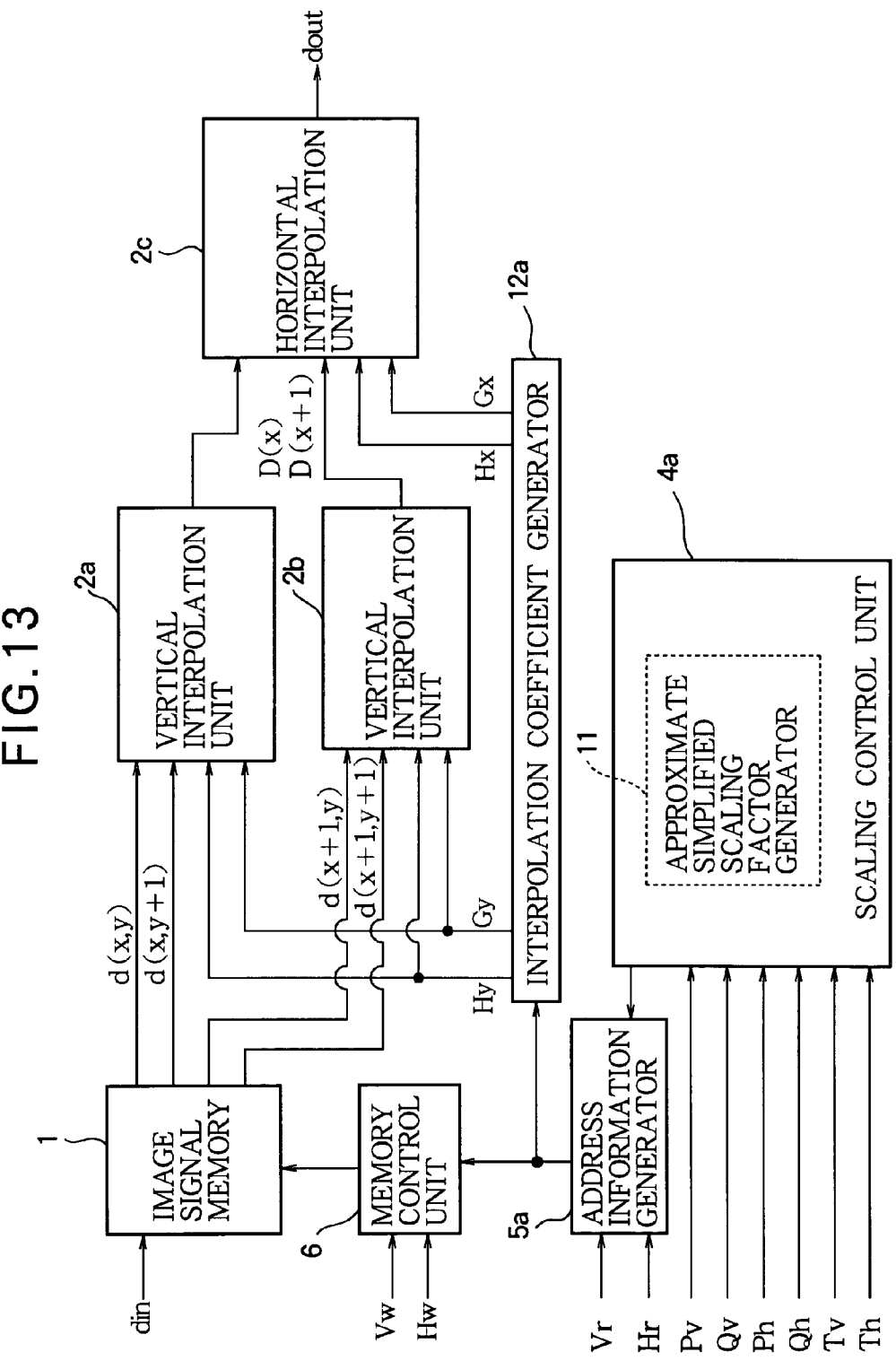
FIG. 13 is a more detailed block diagram of the scaling apparatus in FIG. 12, showing the input and output signals and the internal structure of the interpolation unit.

FIG. 12 is a block diagram of a scaling apparatus according to the second embodiment of the invention. FIG. 13 is a more detailed block diagram of the scaling apparatus in FIG.

12, showing the input and output signals and the internal structure of the interpolation unit.

Aside from dispensing with the interpolation coefficient memory, the structure shown in FIGS. 12 and 13 differs from the structure of the first embodiment in that the interpolation coefficient generator 12a is external to the scaling control unit 4a. The interpolation coefficient generator 12a receives the phase information and selection signals from the address information generator 5a and supplies the upper and lower interpolation coefficients generated therefrom to the interpolation unit 2. The other elements and operations are the same as in the first embodiment.

The scaling control unit 4a comprises an approximate simplified scaling factor generator 11 that receives the values of Pv, Qv, Ph, Qh, Tv, and Th. As in the first embodiment, Pv/Qv is the source scaling factor for the vertical direction, Ph/Qh is the source scaling factor for the horizontal direction, Tv limits the numerators and denominators of the simplified vertical scaling factors, and Th limits the numerators and denominators of the simplified horizontal scaling factors. The approximate simplified scaling factor generator 11 generates upper and lower approximate simplified scaling factors and their repetition counts for the vertical and horizontal directions, and supplies the generated scaling factors and repetition counts to the address information generator 5a.

Besides receiving the upper and lower approximate simplified scaling factors and their repetition counts for the vertical and horizontal directions from the approximate simplified scaling factor generator 11, the address information generator 5a also receives a vertical synchronizing signal Vr and a horizontal synchronizing signal Hr synchronized with the output image signal (dout). The address information generator 5a generates the address information of the reference pixel data to be read from the image signal memory 1, and selection signals and phase information used to generate interpolation coefficients in the interpolation coefficient generator 12a.

The interpolation coefficient generator 12a generates interpolation coefficients in accordance with the selection signals, the numerators of the upper and lower approximate simplified scaling factors, and the phase information supplied from the address information generator 5a, and supplies the generated interpolation coefficients to the interpolation unit 2 (interpolation units 2a, 2b, and 2c).

The operation of the second embodiment will now be described, omitting descriptions of operations that are performed identically in the first embodiment.

The address information generator 5a supplies the interpolation coefficient generator 12a with Pv0, Ph0, Pv1, Ph1, KVsel, KHsel, Rv and Rh. Pv0 and Ph0 are the numerators of the lower approximate simplified scaling factors for the vertical and horizontal directions. Pv1 and Ph1 are the numerators of the upper approximate simplified scaling factors for the vertical and horizontal directions. KVsel and KHsel are selection signals indicating whether the upper or lower approximate simplified scaling factor is to be selected for the vertical and horizontal directions. Rv and Rh are phase differences indicating positional relationships between an interpolated pixel and its reference pixels in the vertical and horizontal directions.

For each interpolated pixel, the interpolation coefficient generator 12a selects the upper or lower approximate simplified scaling factor in the vertical direction and in the horizontal direction depending on the selection signals KVsel and KHsel, and generates interpolation coefficients from the numerators of the selected scaling factors and the phase information Rv and Rh.

When linear interpolation is used, if the numerator of the scaling factor selected for the vertical direction is five and the phase difference Rv between the first reference pixel and the interpolated pixel is three, for example, then the interpolation coefficient Hy generated for the first reference pixel is 0.4, and the interpolation coefficient Gy generated for the second reference pixel is 0.6. These interpolation coefficients can be obtained rapidly by simple arithmetic operations. The horizontal interpolation coefficients Gx and Hx can be generated in a similar way. The generated interpolation coefficients are supplied to the interpolation unit 2.

Although lacking an interpolation coefficient memory, the second embodiment can perform the same scaling operations as the first embodiment. Scaling by any factor can be carried out, with still less concern for hardware constraints such as memory size.

In the embodiments described above, two reference pixels are used for interpolation in the vertical direction, and two in the horizontal direction, but the number of reference pixels in either direction or both directions can be three or greater.

Those skilled in the art will recognize that further variations are possible within the scope of the invention, which is defined by the appended claims.

What is claimed is:

1. A method of scaling an image signal, comprising:
   storing the image signal in an image signal memory;
   receiving a source scaling factor having a numerator and a denominator, the numerator and the denominator being positive integers;
   calculating upper and lower approximate simplified scaling factors, the upper approximate simplified scaling factor being a fraction, greater than the source scaling factor, having a numerator less than the numerator of the source scaling factor and a denominator less than the denominator of the source scaling factor, the lower approximate simplified scaling factor being a fraction, less than the source scaling factor, having a numerator less than the numerator of the source scaling factor and a denominator less than the denominator of the source scaling factor;
   calculating repetition counts indicating how often the upper and lower approximate simplified scaling factors are to be used;
   generating, from the upper and lower approximate simplified scaling factors, address information for reading reference pixels from the image signal stored in the image signal memory, a selection signal selecting the upper approximate simplified scaling factor or the lower approximate simplified scaling factor, and phase information indicating where pixels are to be interpolated in relation to the reference pixels;
   generating interpolation coefficients according to the upper and lower approximate simplified scaling factors and the phase information;
   reading the reference pixels from the source image signal memory according to the address information; and
   performing interpolation on the reference pixels, using the interpolation coefficients corresponding to the approximate simplified scaling factor selected by the selection signal, and outputting interpolated pixels.

2. The method of claim 1, further comprising dividing a line in the source image into a plurality of parts, wherein the selection signal selects just one of the lower approximate simplified scaling factor and the upper approximate simplified scaling factor in each of said parts.

3. The method of claim 1, further comprising receiving a limit value, wherein the numerator and denominator of the lower approximate simplified scaling factor are both within the limit value and the numerator and denominator of the upper approximate simplified scaling factor are both within the limit value.

4. The method of claim 3, wherein, when the source scaling factor is a proper fraction, calculating the lower approximate simplified scaling factor further comprises:
decomposing the proper fraction into unit fractions; and
adding the unit fractions in ascending order of their denominators to obtain a sum fraction, continuing as long as the denominator of the sum fraction stays within the limit value.

5. The method of claim 3, wherein, when the source scaling factor is an improper fraction, calculating the lower approximate simplified scaling factor further comprises:
changing the improper fraction to a mixed number including an integer and a proper fraction;
decomposing the proper fraction into unit fractions; and
adding the unit fractions to the integer in ascending order of their denominators to obtain a new improper fraction, continuing as long as the numerator of the new improper fraction stays within the limit value.

6. The method of claim 3, wherein the repetition count of the lower approximate simplified scaling factor is calculated from the source scaling factor, the lower approximate simplified scaling factor, and the limit value.

7. The method of claim 6, wherein the repetition count of the upper approximate simplified scaling factor is calculated from the source scaling factor, the lower approximate simplified scaling factor, and the repetition count of the lower approximate simplified scaling factor.

8. The method of claim 1, wherein the selection signal is generated by comparing a first cumulative sum with a second cumulative sum, the repetition count of the upper approximate simplified scaling factor being added to the first cumulative sum when the lower approximate simplified scaling factor is selected, the repetition count of the lower approximate simplified scaling factor being added to the second cumulative sum when the upper approximate simplified scaling factor is selected.

9. The method of claim 1, further comprising:
storing the generated interpolation coefficients in an interpolation coefficient memory; and
reading the interpolation coefficients from the interpolation coefficient memory as necessary for performing interpolation.

10. A scaling apparatus for scaling an image signal, comprising:
an image signal memory for storing the image signal;
an approximate simplified scaling factor generator for receiving a source scaling factor having a numerator and a denominator, the numerator and the denominator being integers, calculating upper and lower approximate simplified scaling factors, the upper approximate simplified scaling factor being a fraction, greater than the source scaling factor, having a numerator less than the numerator of the source scaling factor and a denominator less than the denominator of the source scaling factor, the lower approximate simplified scaling factor being a fraction, less than the source scaling factor, having a numerator less than the numerator of the source scaling factor and a denominator less than the denominator of the source scaling factor, and calculating repetition counts indicating how often the upper and lower approximate simplified scaling factors are to be used;

an address information generator for generating, from the upper and lower approximate simplified scaling factors, address information for reading reference pixels from the image signal stored in the image signal memory, a selection signal selecting the upper approximate simplified scaling factor or the lower approximate simplified scaling factor, and phase information indicating where pixels are to be interpolated in relation to the reference pixels;

an interpolation coefficient generator for generating interpolation coefficients corresponding to the upper and lower approximate simplified scaling factors and the phase information; and an interpolation unit for reading the reference pixels from the image signal memory according to the address information, performing interpolation on the reference pixels, using the interpolation coefficients corresponding to the approximate simplified scaling factor selected by the selection signal, and outputting interpolated pixels.

11. The apparatus of claim 10, wherein:
the interpolation unit divides a line in the source image into a plurality of parts; and
the selection signal selects just one of the lower approximate simplified scaling factor and the upper approximate simplified scaling factor in each of said parts.

12. The apparatus of claim 10, wherein the approximate simplified scaling factor generator receives a limit value that limits the numerator and denominator of the lower approximate simplified scaling factor and the numerator and denominator of the upper approximate simplified scaling factor.

13. The apparatus of claim 12, wherein, when the source scaling factor is a proper fraction, the approximate simplified scaling factor generator calculates the lower approximate simplified scaling factor by decomposing the proper fraction into unit fractions and adding the unit fractions in ascending order of their denominators to obtain a sum fraction, continuing as long as the denominator of the sum fraction stays within the limit value.

14. The apparatus of claim 12, wherein, when the source scaling factor is an improper fraction, the approximate simplified scaling factor generator calculates the lower approximate simplified scaling factor by changing the improper fraction to a mixed number including an integer and a proper fraction, decomposing the proper fraction into unit fractions, and adding the unit fractions to the integer in ascending order of their denominators to obtain a new improper fraction, continuing as long as the numerator of the new improper fraction stays within the limit value.

15. The apparatus of claim 12, wherein the approximate simplified scaling factor generator calculates the repetition count of the lower approximate simplified scaling factor from the source scaling factor, the lower approximate simplified scaling factor, and the limit value.

16. The apparatus of claim 15, wherein the approximate simplified scaling factor generator calculates the repetition count of the upper approximate simplified scaling factor from the source scaling factor, the lower approximate simplified scaling factor, and the repetition count of the lower approximate simplified scaling factor.

17. The apparatus of claim 10, wherein the address information generator generates the selection signal by comparing a first cumulative sum with a second cumulative sum, the repetition count of the upper approximate simplified scaling factor being added to the first cumulative sum when the lower approximate simplified scaling factor is selected, the repetition count of the lower approximate simplified scaling factor being added to the second cumu lative sum when the upper approximate simplified scaling factor is selected.

18. The apparatus of claim 10, further comprising an interpolation coefficient memory for storing the generated interpolation coefficients, wherein the interpolation unit reads the interpolation coefficients from the interpolation coefficient memory as necessary when performing interpolation.

* * * * *